(12) United States Patent
Petrucci et al.

(10) Patent No.: US 11,648,867 B2
(45) Date of Patent: May 16, 2023

(54) SYSTEM AND METHOD TO DETECT AND AVOID SPILLED CARGO

(71) Applicant: GM Global Technology Operations LLC, Detroit, MI (US)

(72) Inventors: David R. Petrucci, Warren, MI (US); Gregg R. Kittinger, Oakland Township, MI (US); Kausalya Singuru, Troy, MI (US); Xiujie Gao, Troy, MI (US); Mohannad Murad, Troy, MI (US); Joseph J. Boeve, Lake Orion, MI (US); William P. Ciaramitaro, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 816 days.

(21) Appl. No.: 16/655,828

(22) Filed: Oct. 17, 2019

(65) Prior Publication Data

US 2021/0114505 A1     Apr. 22, 2021

(51) Int. Cl.
*B60P 1/44*     (2006.01)
*G06T 7/73*     (2017.01)
*B60P 3/22*     (2006.01)
*B60R 9/06*     (2006.01)

(52) U.S. Cl.
CPC ............... *B60P 1/4464* (2013.01); *B60P 3/22* (2013.01); *B60R 9/065* (2013.01); *G06T 7/74* (2017.01)

(58) Field of Classification Search
CPC .......... B60P 1/4464; B60P 3/22; B60R 9/065; B60R 2011/0036; B60R 11/04; B60R 5/04; G06T 7/74
See application file for complete search history.

(56) References Cited

U.S. PATENT DOCUMENTS

2007/0071567 A1 * 3/2007 Lim ..................... B60R 11/00
                                                                         410/94
2019/0323281 A1 * 10/2019 Ghannam ............... B60J 5/101

* cited by examiner

*Primary Examiner* — Michael E Teitelbaum
(74) *Attorney, Agent, or Firm* — Vivacqua Crane PLLC

(57) ABSTRACT

A system to detect and avoid spilled cargo in an automobile vehicle, includes an automobile vehicle rear cargo area including a floor to temporarily receive a storage item in the cargo area. A lift gate is moved between a closed and latched position and a fully open position inclusive to allow loading and removal of the storage item. A vision system identifies the storage item when initially loaded in the cargo area and identifies if the storage item is initially positioned in a cargo spill position or subsequently moves to the cargo spill position. A cargo stop device is releasably connected to the lift gate. An operating system releasably stores the cargo stop device when the storage item is not in the cargo spill position and deploys the cargo stop device when the storage item is in the cargo spill position.

13 Claims, 7 Drawing Sheets

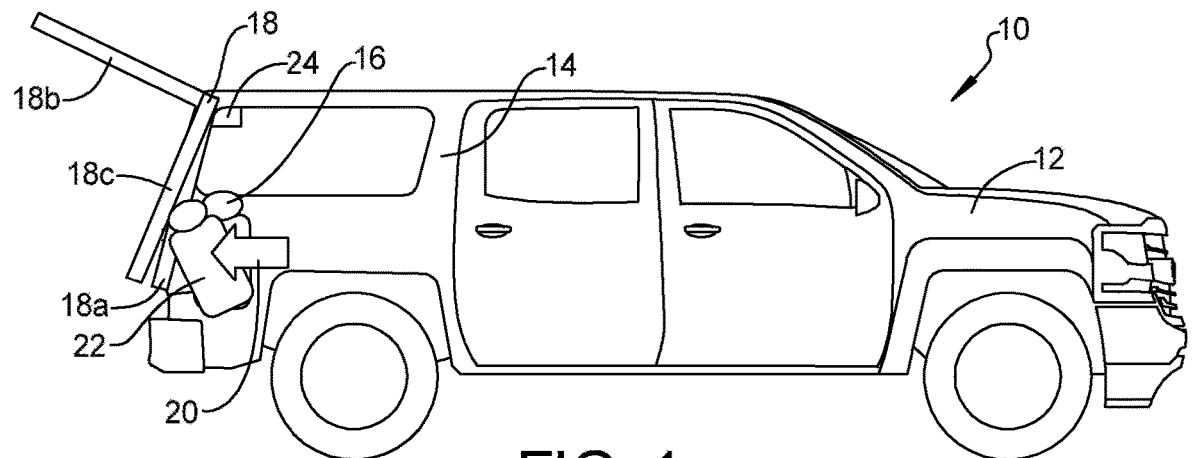
FIG. 1
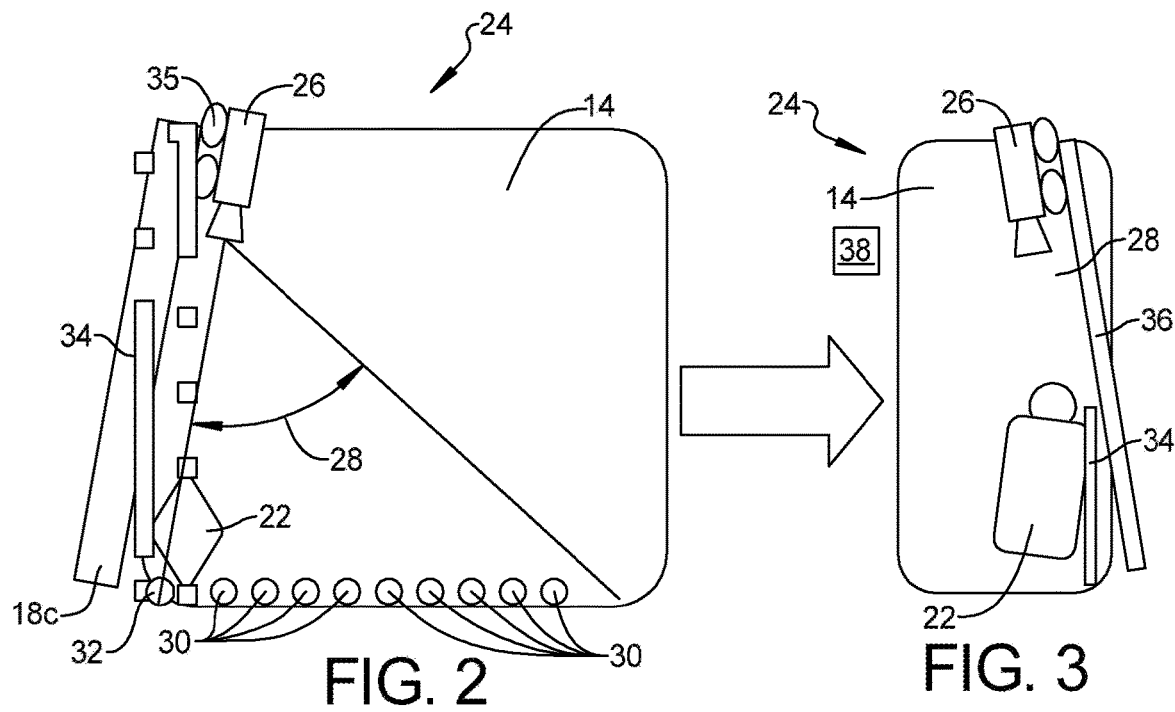
FIG. 2
FIG. 3
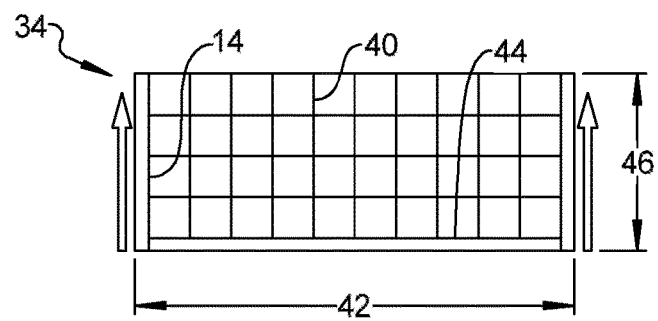
FIG. 4

SYSTEM AND METHOD TO DETECT AND AVOID SPILLED CARGO

INTRODUCTION

The present disclosure relates to sport utility automobile vehicles and sport utility vehicle cargo areas having a lift or rotating gate entrance.

Automobile vehicles including sport utility vehicles, hereinafter SUV or SUVs, commonly include a rear cargo area which is accessible via a lift gate, a rear door or a rotating gate, hereinafter collectively referred to as a "lift gate" that allows access to cargo temporarily stowed in the cargo area. The cargo area is commonly flat which allows access into the cargo area for storage and retrieval of the cargo when the lift gate is open. A common occurrence in known SUVs is for unsecured cargo in the cargo area to shift during vehicle travel, collect or tip against the lift gate, and for the cargo to subsequently spill from the SUV when the lift gate is re-opened. Current systems may also utilize passive "cargo" style nets or gates that the operator deploys and stows. These systems are often unused as they become a hindrance for utilizing the cargo area.

Cargo spillage may be exacerbated due to the ability in known SUVs to remotely automatically open the lift gate. The vehicle operator who may not be aware of cargo directly impinging against the lift gate may actuate a remote lift gate opening switch. The vehicle operator may not have time to exit the vehicle and access the area of the lift gate as the lift gate automatically opens, thereby allowing cargo spillage.

Thus, while current SUV cargo stowage areas achieve their intended purpose, there is a need for a new and improved system and method for detecting and avoiding spilled cargo.

SUMMARY

According to several aspects, a system to detect and avoid spilled cargo in an automobile vehicle includes an automobile vehicle rear cargo area including a floor to at least temporarily receive a storage item in the cargo area. A lift gate is moved between a closed and latched position and a fully open position inclusive to allow loading and removal of the storage item. A vision system identifies the storage item when initially loaded in the cargo area and identifies if the storage item is initially positioned in a cargo spill position or subsequently moves to the cargo spill position. A cargo spill warning alerts an operator of the automobile vehicle when the vision system identifies the storage item is in the cargo spill position.

In another aspect of the present disclosure, a cargo stop device automatically deployed following the cargo spill warning to retain the storage item within the cargo area during subsequent opening of the lift gate.

In another aspect of the present disclosure, the cargo stop device is deployed at the cargo spill position to mitigate against the storage item spilling in a rearward direction out of the cargo area.

In another aspect of the present disclosure, the cargo stop device is releasably engaged to a front facing surface of the lift gate using an operating system having multiple rods including at least a first rod and a second rod.

In another aspect of the present disclosure, a first pin actuator is positioned within a floor housing member and is coupled to a floor structure of the vehicle floor. The first pin actuator rotates a first hook-shaped pin to releasably engage the first rod which retains the cargo stop device, thereby allowing the cargo stop device to be temporarily held by the first hook-shaped pin at the cargo spill position.

In another aspect of the present disclosure, a second pin actuator is positioned within a panel housing member coupled to the cargo stop device. The second pin actuator rotates a second hook-shaped pin within the panel housing member. The second hook-shaped pin is positioned in and rotates in and out of a slot of the panel housing member to releasably engage the first rod to releasably couple the cargo stop device to the lift gate and co-displacing with the lift gate as the lift gate rotates open or closed.

In another aspect of the present disclosure, the cargo spill position defines a position of the storage item wherein the storage item may lean against the lift gate or may be angled to tip toward the lift gate such that the storage item may spill out of the cargo area when the lift gate is subsequently moved away from the closed and latched position.

In another aspect of the present disclosure, the cargo spill position is defined as a visually detectable stripe which if visible to the vision system indicates the storage item is clear of the lift gate, and if partially or fully blocked from the vision system indicates presence of the storage item at the lift gate.

In another aspect of the present disclosure, a stop position of the lift gate defines an unlatched but not fully open position of the lift gate, wherein an opening operation of the lift gate is stopped at the stop position mitigating against spilling the storage item out of the automobile vehicle if the storage item is detected in the cargo spill position.

In another aspect of the present disclosure, the vision system includes a camera providing a camera field-of-vision (FOV) within the cargo area, the camera FOV identifying multiple positions of the storage item from the cargo spill position.

According to several aspects, a system to detect and avoid spilled cargo in an automobile vehicle includes an automobile vehicle rear cargo area including a floor to at least temporarily receive a storage item in the cargo area. A lift gate moved between a closed and latched position and a fully open position inclusive allows loading and removal of the storage item. A vision system identifies the storage item when initially loaded in the cargo area and identifies if the storage item is initially positioned in a cargo spill position or subsequently moves to the cargo spill position. A cargo stop device is releasably connected to the lift gate. An operating system releasably stores the cargo stop device when the storage item is not in the cargo spill position and deploys the cargo stop device when the storage item is in the cargo spill position.

In another aspect of the present disclosure, a rod is connected to the cargo stop device. A first hook member is rotatably connected to the cargo stop device and is rotated by operation of the operating system. The first hook member in a first position releasably engages to the rod to releasably connect the cargo stop device to the lift gate.

In another aspect of the present disclosure, a second hook member is rotatably connected to a structural member of the automobile vehicle and is rotated by operation of the operating system. The second hook member in a second hook member first position is disengaged from the rod.

In another aspect of the present disclosure, the first hook member when moved to a first hook member second position is released from the rod permitting the cargo stop device to move freely with respect to the lift gate.

In another aspect of the present disclosure, when the first hook member is in the first hook member second position the second hook member is moved to a second hook member second position to releasably engage to the rod to releasably retain the cargo stop device to the structural member of the vehicle.

In another aspect of the present disclosure, the cargo stop device defines a net.

In another aspect of the present disclosure, a cargo spill warning alerts an operator of the automobile vehicle when the vision system identifies the storage item is in the cargo spill position.

According to several aspects, a method for detecting and avoiding spilled cargo in an automobile vehicle includes: providing a lift gate at a cargo area of an automobile vehicle moved between a closed and latched position and a fully open position inclusive; positioning a storage item in the rear cargo area; positioning a cargo stop device at the lift gate with the cargo stop device initially releasably connected to the lift gate; using a vision system to identify the storage item at an initial position when initially loaded in the cargo area and to detect if the storage item subsequently moves to second position defining a cargo spill position; and employing an operating system to release the cargo stop device from the lift gate and to deploy the cargo stop device to the cargo spill position when the storage item is detected in the cargo spill position to mitigate against release of the storage item as the lift gate moves toward the fully open position.

In another aspect of the present disclosure, the method further includes: calculating lines representing segments or portions of the cargo area including one or more lines representing the cargo spill position proximate to the lift gate, and lengths of the lines using a Hough transform equation; determining if at initialization a line is detected at a y(:) position of the visually detectable cargo spill position; identifying if a length of the visually detectable cargo spill position is less than a length_actual of the line [is: length<length_actual]; and forwarding a cargo spill detected signal to the operation system if a response to the identifying step is YES to initiate release the cargo stop device.

In another aspect of the present disclosure, the method further includes: confirming receipt of a lift gate open request when the automobile vehicle is in a park gear; detecting images of the storage item in the initial position and at the second position; identifying Harris features of the storage item in the first position and the second position; extracting neighborhood features of the storage item; matching the neighborhood features to detect a feature point location shift in the images of the storage item in the initial position and at the second position; determining if new feature points are detected in a cargo spill position Y-axis; and generating a cargo spill detected signal if a response to the determining step is YES to initiate release the cargo stop device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a side elevational view of an automobile vehicle having a system to detect and avoid spilled cargo according to an exemplary aspect;

FIG. 2 is a side elevational view of a portion of a cargo area of the automobile vehicle of FIG. 1;

FIG. 3 is a side elevational view of another aspect of a deployed cargo stop device;

FIG. 4 is a rear elevational view of another aspect of a deployed cargo stop device;

DETAILED DESCRIPTION

Figure 5:
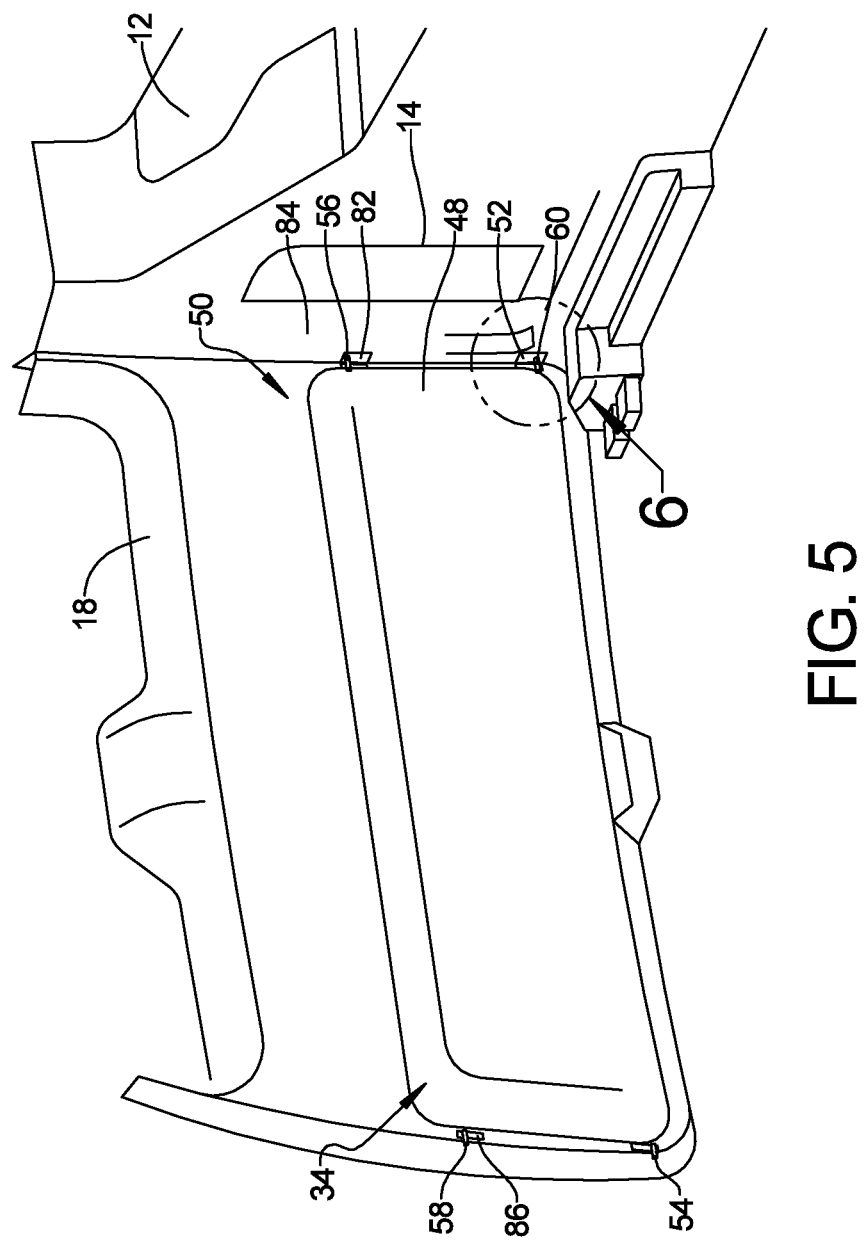
FIG. 5 is a rear perspective view of a lift gate having a cargo stop device releasably retained to a lift gate.

The following description is merely exemplary in nature and is not intended to limit the present disclosure, application, or uses.

Referring to FIG. 1, a system to detect and avoid spilled cargo 10 is provided in an automobile vehicle 12 such as a sport utility vehicle (SUV). The automobile vehicle 12 provides a rear cargo area 14 which includes a flat floor for a predetermined length of the cargo area 14, which may be fixed or provided by folding down rear seats (not shown in this view) of the automobile vehicle 12. A vehicle operator can at least temporarily position cargo such as a storage item 16 in the cargo area 14. The storage item 16 can be one item or more than one individual items of cargo, having the same or different geometries. The automobile vehicle 12 also provides a lift gate 18, which may be a top hinged lift gate (shown) design or a side hinged swing gate (not shown) design. The lift gate 18 can be moved between a closed and latched position 18*a* and a fully open position 18*b* inclusive, to allow loading and removal of the storage item 16. According to several aspects a stop position 18*c* is also incorporated in the travel path between the latched position 18*a* and the fully open position 18*b* to mitigate against spillage of the storage item 16.

During operation of the automobile vehicle 12 including during acceleration and cornering the storage item 16 can move in a rearward direction 20 to a cargo spill position 22 wherein the storage item 16 may lean against the lift gate 18 or may be angled to tip toward the lift gate 18. If the storage item 16 moves to the cargo spill position 22, the storage item 16 may spill out of the cargo area 14 of the automobile vehicle 12 when the lift gate 18 is subsequently moved away from the latched position 18*a*. The stop position 18*c* represents an unlatched but not fully open position of the lift gate 18 which mitigates against spilling the storage item 16 if the storage item 16 is detected in the cargo spill position 22. A vision system 24 of the system to detect and avoid spilled cargo 10 is provided to identify the storage item 16 when initially loaded in the cargo area 14 and to identify if the storage item 16 is initially positioned in the cargo spill position 22 or subsequently moves to the cargo spill position 22. The vision system 24 is used to analyze positions of the storage item 16 at the time of lift gate closure and to re-analyze for storage item shifting at a later time at the initiation of or during lift gate opening.

Referring to FIG. 2 and again to FIG. 1, according to several aspects the vision system 24 of the system to detect and avoid spilled cargo 10 includes a camera 26 which provides a camera field-of-vision (FOV) 28 within the cargo area 14. The camera FOV 28 identifies multiple storage item positions 30 from one or more potential cargo spill positions 32 located proximate to the lift gate 18. The vision system 24 further identifies between the initial stored positions of the storage item 16 from the cargo spill position 22, which may include the storage item 16 located on or at the potential cargo spill position 32 or angularly leaning against the lift gate 18. According to another aspect, the cargo spill position 32 can also be defined as a visually detectable stripe or marker, better shown and described in reference to FIG. 9, which if visible to the vision system 24 indicates the lift gate 18 is clear of storage items 16, and if partially or fully blocked from the vision range of the vision system 24 indicates the presence or the potential presence of the storage item 16 at the cargo spill position 22.

When the vision system 24 identifies the storage item 16 is in the cargo spill position 22 a cargo spill warning is given to an operator of the automobile vehicle 12. The cargo spill warning may be an audible or a visible warning, or both. After the cargo spill warning issues, if the vehicle operator attempts to open the lift gate 18 either automatically such as by engaging a rear door release button located for example on a vehicle dashboard or manually at a rear door latch release lever, a cargo stop device 34 which may be a gate door portion or a net is deployed and retained in place during subsequent opening of the lift gate 18. The cargo stop device 34 is deployed at the cargo spill position 22 to mitigate against the storage item 16 spilling in the rearward direction 10 out of the cargo area 14. According to several aspects the cargo stop device 34 is releasably engaged to a front facing surface of the lift gate 18 such that the storage item 16 located at the cargo spill position 22 may directly contact the cargo stop device 34.

According to several aspects the vision system 24 of the system to detect and avoid spilled cargo 10 may further include a sensor 35 such as a lift gate position sensor. The sensor 35 generates signals indicating when the lift gate 18 leaves the latched position 18a shown in FIG. 1 and when the lift gate 18 reaches the fully open position 18b also shown in FIG. 1.

Referring to FIG. 3 and again to FIG. 2, the cargo stop device 34 will deploy forward of a rear extent 36 of the camera FOV 28. This ensures the vision system 24 can monitor the original stored position of the storage item 16 and the cargo spill position 22, as well as a stored position and the correct deployed position of the cargo stop device 34. Data representing a geometry of the cargo stop device 34 at the stored position and a correct deployed position of the cargo stop device 34 are saved in a memory 38 of the vision system 24. This data provides for comparison to identify between the stowed position and the deployed position of the cargo stop device 34.

Referring to FIG. 4 and again to FIGS. 2 and 3, the cargo stop device 34 in one exemplary aspect defines a cargo net 40. The cargo net 40 can extend across a total width 42 of the cargo area 14 and can extend down to a floor 44 of the cargo area 14. A height 46 of the cargo stop device 34 can range from approximately 10 cm (4 in) up to approximately 40 cm (16 in) inclusive to accommodate different cargo area designs and different designs of the cargo stop device 34.

Figure 6:
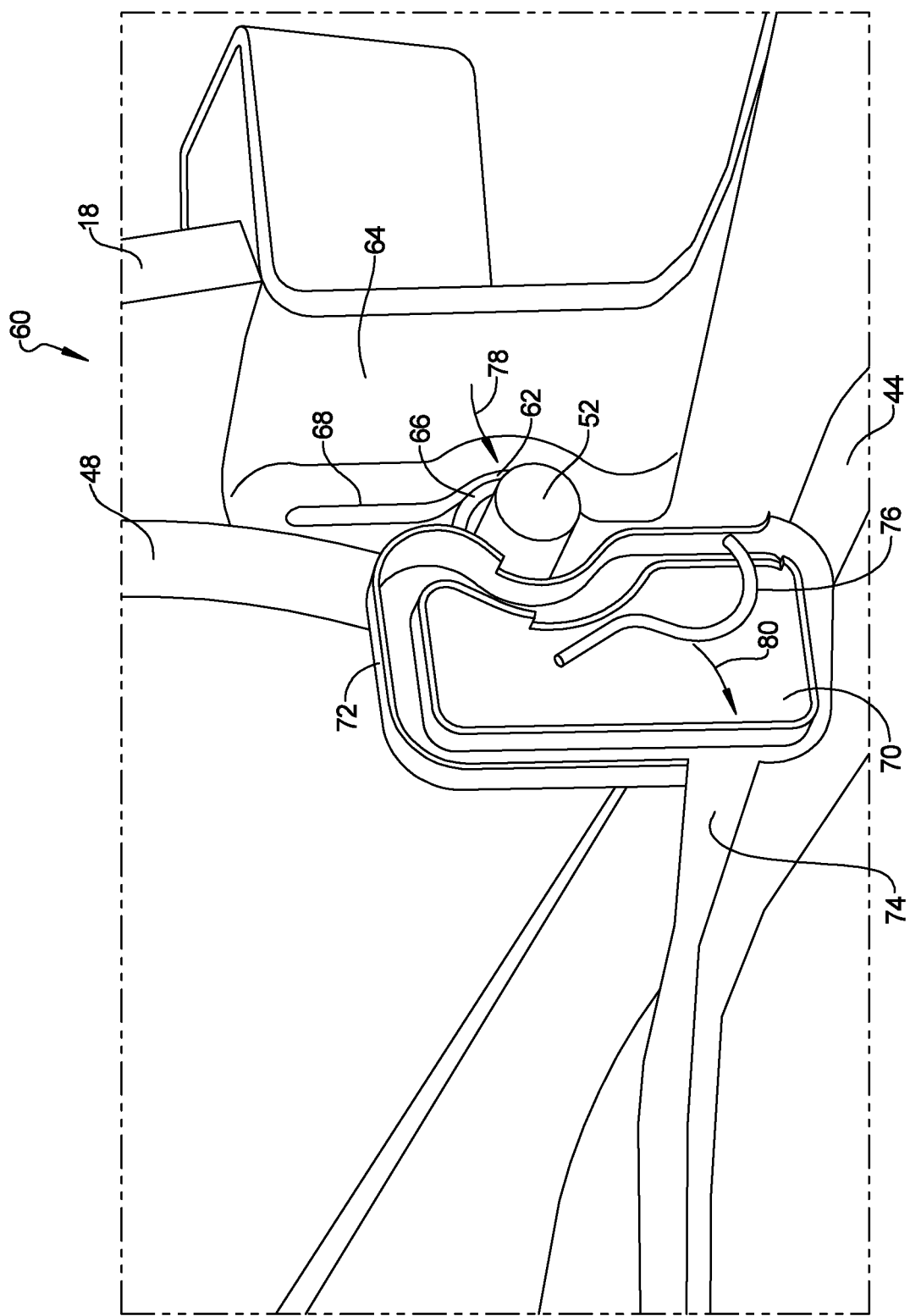
FIG. 6 is a side elevational perspective view of area 6 of FIG. 5.
Figure 7:
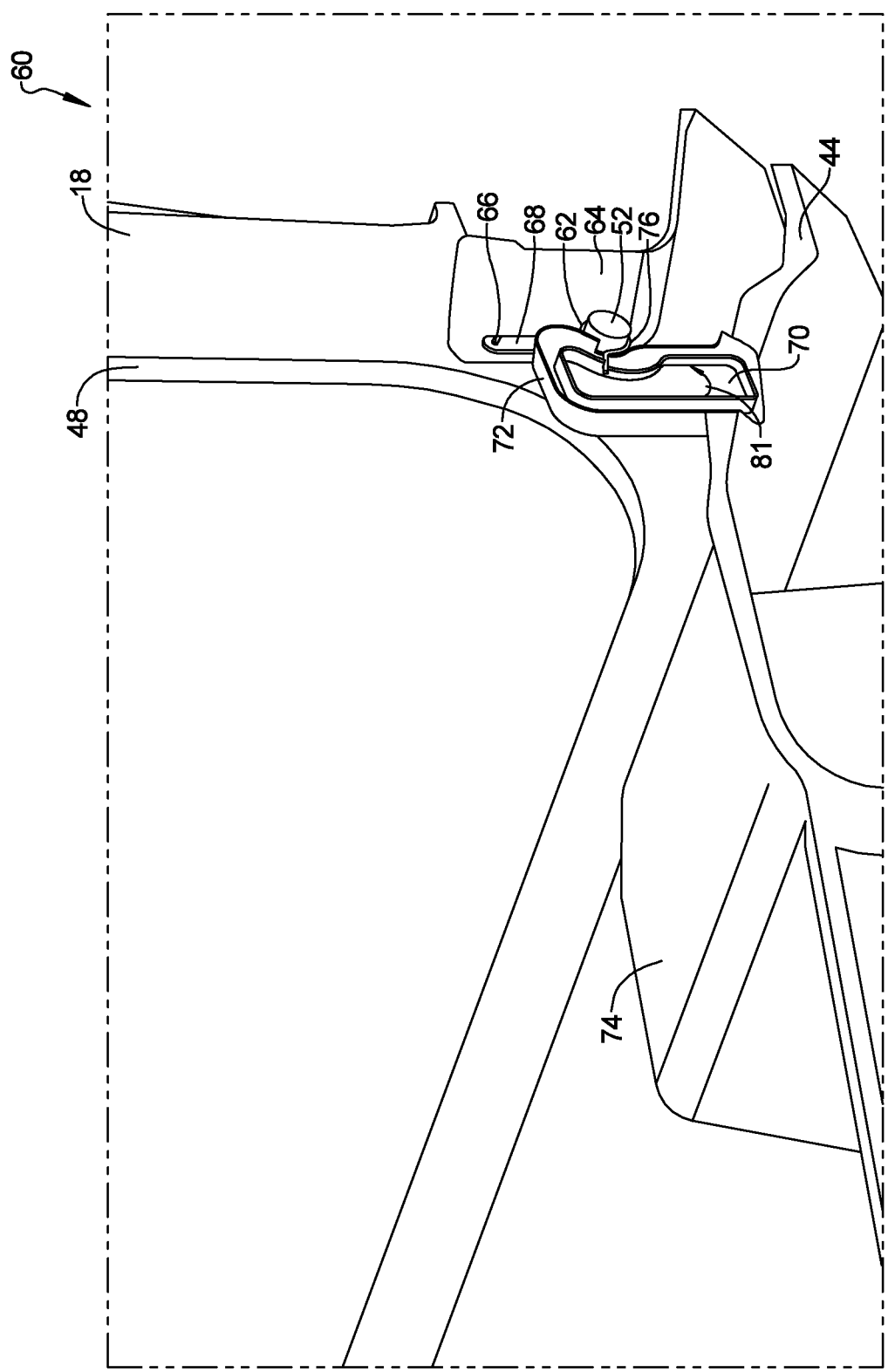
FIG. 7 is a side elevational perspective view similar to FIG. 7.

Referring to FIG. 5 and again to FIGS. 1 through 4, the cargo stop device 34 in one exemplary aspect defines a cargo panel 48. The cargo panel 48 may be retained in direct contact with a forward directed face 50 of the lift gate 18 in a substantially perpendicular orientation with respect to the floor 44 (not visible in this view for clarity) of the cargo area 14 of the automobile vehicle 12 when the lift gate 18 is in the closed and latched position 18a shown in reference to FIG. 1. According to several aspects the cargo panel 48 defines a rectangular shape and is releasably connected to the lift gate 18 using an operating system having multiple rods, for example a first rod 52, a second rod 54, a third rod 56 and a fourth rod 58. An operating system 60 described in greater detail in reference to FIGS. 6 through 7 is used to releasably store and to deploy cargo stop device 34 defining the cargo panel 48. The cargo panel 48 is shown in FIG. 5 in a stowed position directly abutting the forward directed face 50 of the lift gate 18, and in the stowed position will co-displace together with the lift gate 18 as the lift gate 18 moves between the closed and latched position 18a shown and the fully open position 18b shown and described in reference to FIG. 1.

Referring to FIG. 6 and again to FIGS. 1 through 5, the operating system 60 functions similarly with respect to the first rod 52, the second rod 54, the third rod 56 and the fourth rod 58, therefore the following discussion of the operating system 60 with respect to the first rod 52 applies equally to the second rod 54 and will be modified as noted below with respect to the third rod 56 and the fourth rod 58. To releasably couple the cargo panel 48 to the lift gate 18, a first pin actuator 62 (partially visible in this view) is positioned within a panel housing member 64 coupled to the lift gate 18. The first pin actuator 62 rotates a first hook-shaped pin 66 shown in a first pin first position in this view releasably coupled to the first rod 52. The first hook-shaped pin 66 is positioned in and rotates in and out of a slot 68 of the panel housing member 64. A second pin actuator 70 is positioned within a floor housing member 72 which is coupled to a vehicle structure member 74, for example to the vehicle floor 44. The second pin actuator 70 rotates a second hook-shaped pin 76 to releasably engage or disengage from the first rod 52. With the second hook-shaped pin 76 disengaged from the first rod 52 and the first hook-shaped pin 66 engaged to the first rod 52 as shown, the cargo panel 48 is releasably engaged to the lift gate 18 and will co-displace with the lift gate 18. To releasably couple the cargo panel 48 to the lift gate 18, the first hook-shaped pin 66 is rotated from a first pin second position within the slot 68 to a first pin first position out of the slot 68 of the floor housing member 72 in an arc of rotation 78 to releasably engage the first rod 52 and the second hook-shaped pin 76 is rotated in an arc of rotation 80 away from engagement with the first rod 52.

Referring to FIG. 7 and again to FIG. 6, to releasably couple the cargo panel 48 to the vehicle structure member 74, sequentially, the second hook-shaped pin 76 is rotated about an arc of rotation 81 from a second pin second position disengaged from the first rod 52 to a second pin first pin first position (shown) to engage the second hook-shaped pin 76 with the first rod 52, and the first hook-shaped pin 66 is disengaged from the first rod 52 and retracted into the slot 68 of the panel housing member 64 in the first pin second position shown. The cargo panel 48, now releasably coupled to the vehicle structure member 74, is released from the lift gate 18 allowing the lift gate 18 to rotate open with the cargo panel 48 retained in an upright position shown which mitigates against the stored item 16 (not shown in this view) spilling out of the cargo area 14.

Referring again to FIGS. 5, 6 and 7 the following discussion of the operating system 60 is modified with respect to the third rod 56 and the fourth rod 58 as follows. As more specifically shown in FIG. 5, to engage or release the third rod 56 and the fourth rod 58, a third pin actuator 82 is positioned within a rear door housing member which is fixed to a rear door frame 84. The third pin actuator 82 and the associated hook-shaped pin releasably couple the cargo panel 48 to the rear door frame 84. A fourth pin actuator 86 having a hook-shaped pin (not clearly visible in this view) engages or releases the fourth rod 58. The fourth pin actuator 86 rotates the hook-shaped pin (not clearly visible in this view) to engage the fourth rod 58 to releasably couple the cargo panel 48 to the lift gate 18. Additional pin actuators (not shown) are provided proximate to the third pin actuator 82 and the fourth pin actuator 86 to either releasably couple the third rod 56 to the lift gate 18 or to releasably couple the fourth rod 58 to the rear door frame 84 on an opposite side of the rear door frame 84 from the third pin actuator 82.

Figure 8:
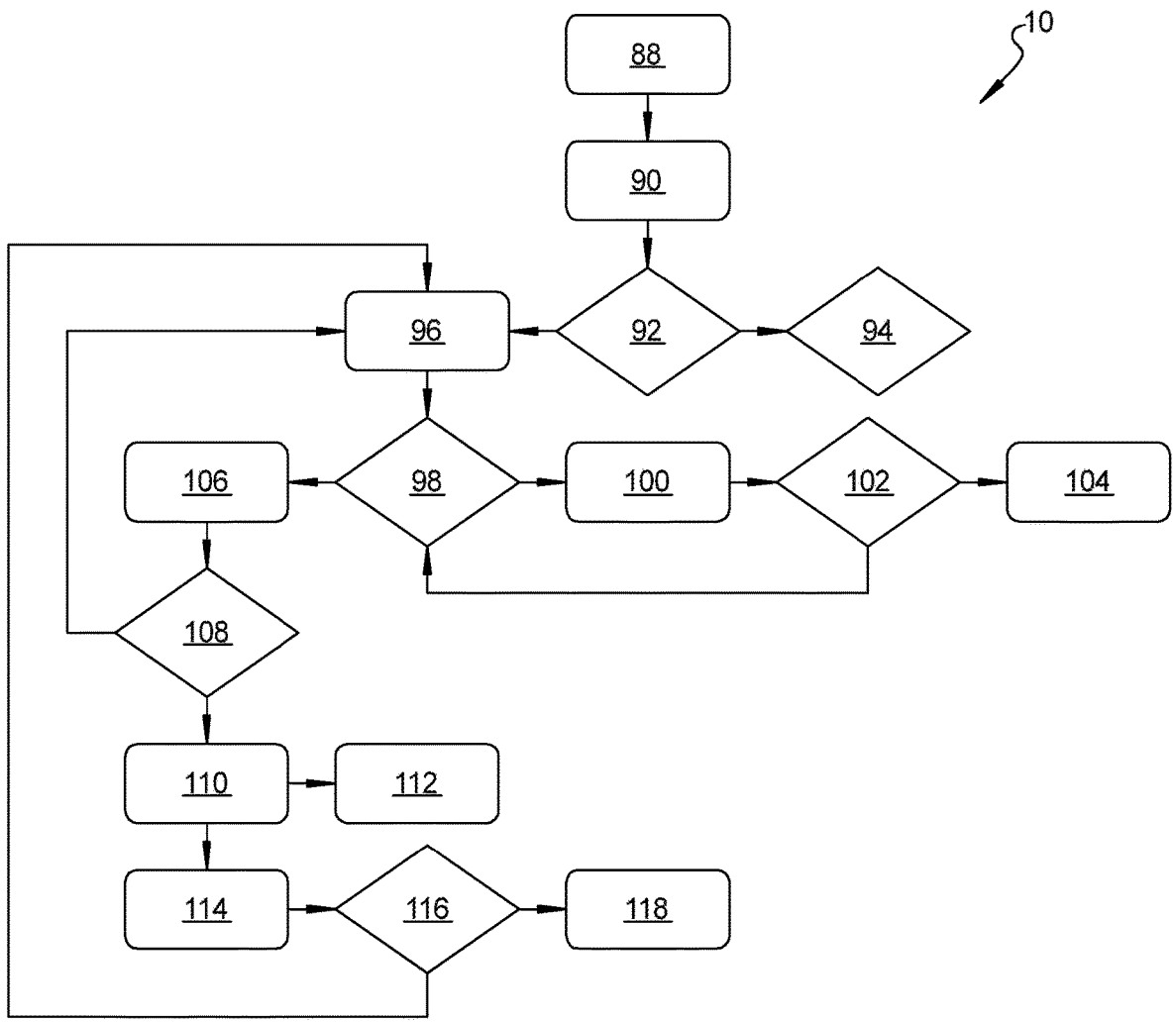
FIG. 8 is a flow diagram of method steps for utilizing the system to detect and avoid spilled cargo of FIG. 1.

Referring to FIG. 8 and again to FIGS. 1 through 7, method steps for utilizing the system to detect and avoid spilled cargo 10 initiate with a request for lift gate opening 88, which can be requested by the vehicle operator actuating a key fob, depressing an internal button such as on a vehicle dashboard or console, or depressing or actuating an externally located button or latch such as on the lift gate 18. Performing the request for lift gate opening 88 initializes a start of cargo monitoring logic step 90. After the start of cargo monitoring logic step 90 is initiated a check step 92 is performed to identify if there is evidence of cargo such as the storage item 16 present in the cargo area 14. If a response to the check step 92 is NO, indicating no storage item 16 is present, in a permission step 94 the lift gate 18 is permitted to open at a full opening speed.

If a response to the check step 92 is YES, indicating that the storage item 16 is present in the cargo area 14, in an honor step 96 the opening command to open the lift gate 18 is allowed to progress, and the camera FOV 28 of the camera 26 is monitored to determine if further movement of the storage item 16 within the cargo area 14 is determined. In an opening percentage check step 98, the FOV 28 of the vision system 24 is examined to determine if the cargo spill position 32 defined by the visually detectable stripe is visible. If the cargo spill position 32 defined by the visually detectable stripe is visible the lift gate 18 is deemed to be clear of storage items 16 and in a continuation step 100 continued opening of the lift gate 18 progresses. The sensor 35 such as the lift gate position sensor described in reference to FIG. 2 is monitored during lift gate opening in a monitoring step 102 to determine if the lift gate 18 is 100% open, and when the response to the monitoring step 102 is YES, the program for the system to detect and avoid spilled cargo 10 ends.

As noted above, during the opening percentage check step 98, the camera FOV 28 of the vision system 24 is monitored to determine if the cargo spill position 32 defined by the visually detectable stripe is visible. If the cargo spill position 32 defined by the visually detectable stripe is NOT visible the lift gate 18 is deemed to be at least partially hindered by storage items 16 and in a speed change step 106 an opening speed of the lift gate 18 is changed to an ultra-slow opening speed, less than the full opening speed authorized in response to the permission step 94. As the lift gate 18 opens at the ultra-slow opening speed, the camera FOV 28 of the vision system 24 is monitored in a shifting determination step 108 to determine if evidence of cargo shifting of the storage item 16 has occurred or is occurring. If a response to the shifting determination step 108 is NO indicating cargo shifting of the storage item 16 HAS NOT occurred the program continues with the honor step 96 described above. If a response to the shifting determination step 108 is YES, cargo shifting of the storage item 16 HAS occurred and a lift gate stop step 110 is performed. During the lift gate stop step 110 continued opening of the lift gate 18 is halted and one of multiple mitigation methods described below is available.

Figure 9:
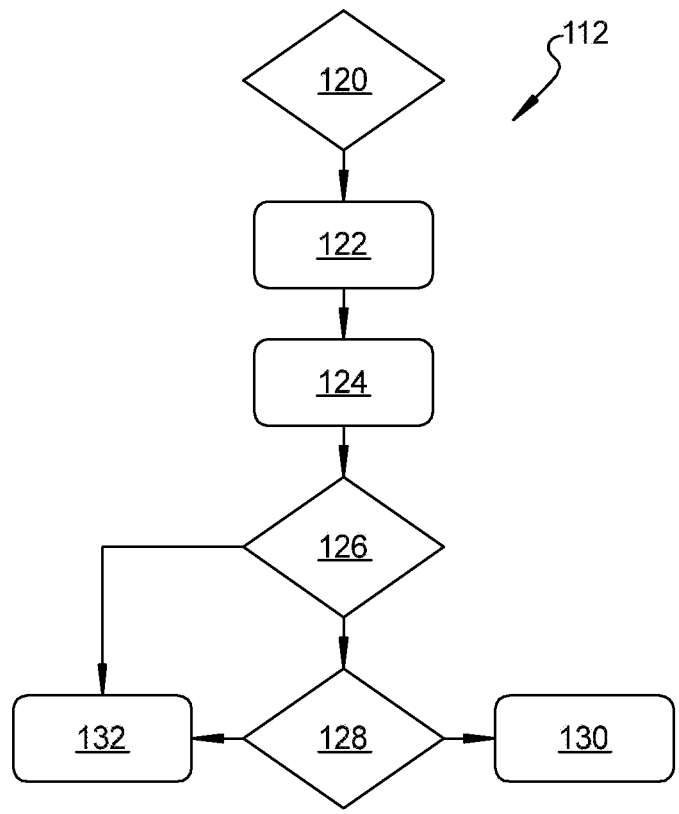
FIG. 9 is a flow diagram of first method steps for utilizing the system to detect and avoid spilled cargo of FIG. 1.

A first one of the multiple mitigation methods defining a first mitigation method 112 is described in greater detail in reference to FIG. 9. A second one of the multiple mitigation methods defining a second mitigation method 114 is described in greater detail in reference to FIGS. 11 and 12. Part of the second mitigation method 114 includes continued operation of the lift gate 18 in the ultra-slow speed described above in reference to the speed change step 106. During conduction of the second mitigation method 114 a cargo shift determination 116 is performed. If the response to the cargo shift determination 116 is NO, there is no evidence of shifting of the storage item 16 and the program returns to the honor step 96 described above. If the response to the cargo shift determination 116 is YES, evidence of at least some shifting of the storage item 16 has been detected and in a stop step 118 movement of the lift gate 18 is halted and a storage item shift warning is generated.

Referring to FIG. 9 and again to FIGS. 1 through 8, method steps for utilizing the system to detect and avoid spilled cargo 10 using the first mitigation method 112 are as follows. In an initiation step 120 a vehicle transmission is shifted or confirmed shifted from Drive to Park gear, and receipt of a lift gate open request is confirmed. In a snapshot step 122, a snapshot of the cargo area 14 of the automobile vehicle 12 is taken using the camera 26. In a transformation step 124, lines representing segments or portions of the cargo area 14 including one or more lines representing the cargo spill position 32 defined as the visually detectable stripe located in the cargo area 14 proximate to the lift gate 18 are generated, and lengths of the lines are calculated using a Hough transform equation. In a detection step 126 a determination is made if at initialization a line is detected at a y(:) position of the visually detectable stripe. If a response to the detection step 126 is YES, a calculation step 128 is performed using Equation 1 below to determine if a length of the visually detectable stripe is less than a length_actual of the line.

$$\text{is length} < \text{length\_actual} \qquad \text{Eq. 1}$$

If a response to the calculation step 128 is NO, a no-cargo spill detected signal 130 is generated. If a response to the calculation step 128 is YES, a cargo spill detected signal 132 is generated. In addition, if a response to the detection step 126 above is NO the storage item 16 is at least partially covering the visually detectable stripe and the cargo spill detected signal 132 is therefore generated.

Figure 10:
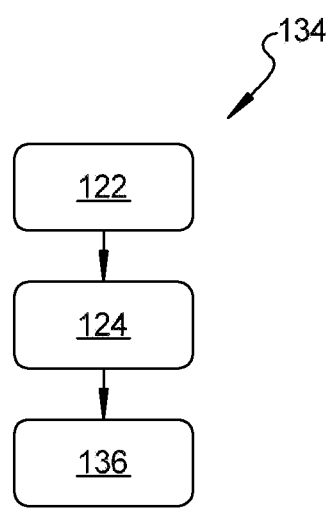
FIG. 10 is a flow diagram of calibration steps for utilizing the system to detect and avoid spilled cargo of FIG. 1.

Referring to FIG. 10 and again to FIG. 9, prior to operation using the first mitigation method 112 a calibration operation 134 is performed including an initial camera calibration and a calibration confirming visibility of the visually detectable stripe or safety line, also defined as the cargo spill position 32, are performed. During the calibration operation 134, the snapshot step 122 is conducted wherein a snapshot of the cargo area 14 of the automobile vehicle 12 is taken using the camera 26. Also during the calibration operation 134 the transformation step 124 is conducted wherein lines representing segments or portions of the cargo area 14 including one or more lines representing the cargo spill position 32, and lengths of the lines are calculated using a Hough transform equation. During the calibration operation 134 a length of a line segment at the safety line or cargo spill position 32 is defined as the length_actual described above in reference to FIG. 9.

Referring to FIG. 11 and again to FIG. 9 the second mitigation method 114 includes continued operation of the lift gate 18 in the ultra-slow speed described above in reference to the speed change step 106. During conduction of the second mitigation method 114 the cargo shift determination 116 is performed. The cargo shift determination 116 is performed by finding corresponding interest points between a pair of images of the storage item 16 using local neighborhoods and a Harris algorithm. The storage item 16 may be resting on the floor 44 of the cargo area 14. According to several aspects, the storage item 16 is represented as an exemplary container 140 such as a milk carton, however it will be obvious the storage item 16 can be any item having any of multiple different geometries which is received in the cargo area 14 of the automobile vehicle 12. The container 140 is presented in two different positions defining a first position 142 and a second position 144. A safety line x-y grid array 146 is provided which provides comparison grid locations to identify different positions for one or more features of the container 140 at the first position 142 and the second position 144.

Figure 11:
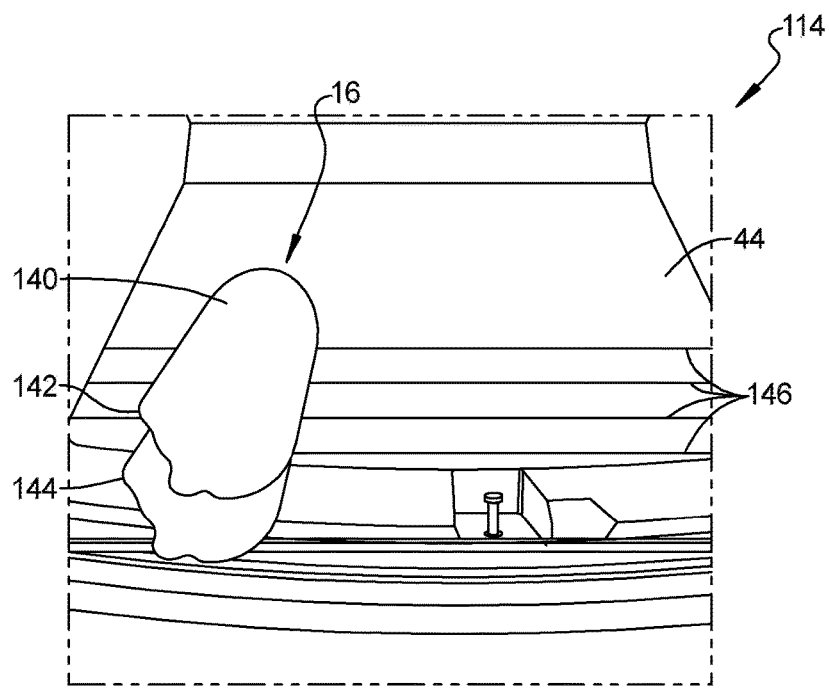
FIG. 11 is a rear elevational perspective view of a cargo area safety line x-y grid array for utilizing the system to detect and avoid spilled cargo of FIG. 1.
Figure 12:
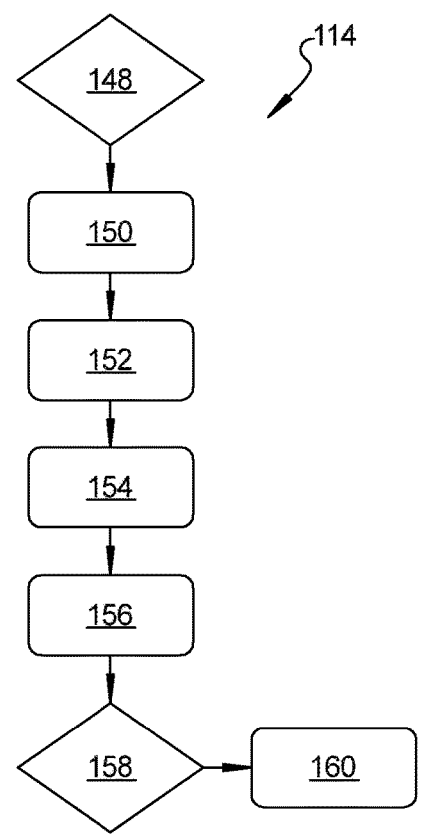
FIG. 12 is a flow diagram of second method steps for utilizing the system to detect and avoid spilled cargo of FIGS. 1 and 11.

Referring to FIG. 12 and again to FIG. 11, method steps for utilizing the system to detect and avoid spilled cargo 10 using the second mitigation method 114 are as follows. In an initiation step 146 a vehicle transmission is shifted or confirmed shifted from Drive to Park gear, and receipt of a lift gate open request is confirmed. In a reading/detecting step 148 images of the container 140 in the first position 142 and the second position 144 are read, and Harris features of the container 140 in the first position 142 and the second position 144 are detected. In an extraction step 150 neighborhood features of the container 140 in the cargo area 14 are extracted. In a match step 152 the features of the extraction step 150 are matched to detect a feature point location shift by matching the detected features in the two different images. In a retrieval step 154 locations of corresponding points for the two different images of the container 140 are retrieved from the collected data. In a feature point identification step 156 a determination is made if new feature points are detected in a safety line Y-axis. If a response to the feature point identification step 156 is YES, in a notification step 158 a cargo spill signal is generated and a cargo spill position is identified using the features of interest in the safety line x-y grid array 146.

The system to detect and avoid spilled cargo 10 includes the following features: 1) The cargo camera 26 is provided having a wide field-of-view lens to see an entirety of the cargo area 14; 2) A grid array 146 of lines is defined in the cargo area 14 which is used by the vision system 24 to identify initial and changed positions of the stored items 16 in the cargo area 14; 3) The "safety strip" defining the cargo spill position 32 is not exposed with the lift gate 18 closed but becomes exposed as the lift gate 18 opens; 4) A self-calibration of a safety line length is performed using a Hough transform; 5) A warning signal is generated to warn the vehicle operator of a pending or potential storage item 16 spillage; 6) If the warning signal is generated, an active mitigation is performed to contain the storage item 16, thereby mitigating against spillage; 7) The "lift gate" concept may provide a separate gate structure as part of the lift gate 18; 8) In the event a cargo spill position is detected the lift gate structure latches to vehicle structure to provide a barrier that mitigates against the storage item 16 falling out of the automobile vehicle 12; and 9) A retractable material such as the cargo net 40 may be packaged in the lift gate 18, and in the event a potential storage item spill event is detected a latch is engaged as the lift gate 18 is opening which deploys the "retractable material" which catches the storage item 16 to mitigate against the storage item 16 falling out of the automobile vehicle 12.

In addition to the above features, the system to detect and avoid spilled cargo 10 may also include the following features. A vehicle slope is determined using a known hill assist feature. If the vehicle slope reaches a predetermined threshold wherein storage item 16 spill is indicated, a vehicle operator alert is generated. A light fence may be energized when the lift gate 18 opens. If an object such as the storage item 16 crosses the light fence, a signal is generated to stop further opening of the lift gate 18. A pressure sensor on or in the lift gate 18 identifies if pressure is applied to the lift gate 18 from an object such as the storage item 16. The pressure sensor can also be used to indicate an object is being pinched by the lift gate 18 and lift gate motion can be halted. Pressure acting on the lift gate 18 will generate a signal halting further operation of the lift gate 18. The lift gate 18 can be provided with a "smart motor" which detects when a reduced operating load is present on the lift gate 18. The reduced operation load may indicate an object is pushing or assisting lift gate opening and motor operation may be stopped.

A system to detect and avoid spilled cargo 10 of the present disclosure offers several advantages. These include a system having the ability to detect the presence of cargo or storage items in an SUV cargo area through the use of a vision system and a predefined grid structure in the sport utility vehicle. The vision system detects movement of the cargo and a control system judges a probability of cargo spilling from the vehicle as a positive spill event. If a positive spill event is detected the system will engage an active cargo management system to contain the storage item thereby mitigating against a storage item spill and allow the lift gate to fully open.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system to detect and avoid spilled cargo in an automobile vehicle, comprising:
    an automobile vehicle rear cargo area including a floor to at least temporarily receive a storage item in the cargo area;
    a lift gate moved between a closed and latched position and a fully open position inclusive to allow loading and removal of the storage item;
    a vision system to identify the storage item when initially loaded in the cargo area and to identify if the storage item is initially positioned in a cargo spill position or subsequently moves to the cargo spill position;
    a cargo spill warning alerting an operator of the automobile vehicle when the vision system identifies the storage item is in the cargo spill position; and
    a cargo stop device automatically deployed following the cargo spill warning to retain the storage item within the cargo area during subsequent opening of the lift gate, wherein the cargo stop device defines a cargo panel deployed at the cargo spill position to mitigate against the storage item spilling in a rearward direction out of the cargo area, wherein the cargo panel is releasably engaged to a front facing surface of the lift gate using an operating system having multiple rods including at least a first rod and a second rod, and further including a first pin actuator positioned within a floor housing member and coupled to a floor structure of the floor, the first pin actuator rotating a first hook-shaped pin to releasably engage the first rod which retains the cargo panel, thereby allowing the cargo panel to be temporarily held by the first hook-shaped pin at the cargo spill position.

2. The system to detect and avoid spilled cargo of claim 1, further including a second pin actuator positioned within a panel housing member coupled to the cargo panel, the second pin actuator rotating a second hook-shaped pin within the panel housing member, the second hook-shaped pin positioned in and rotating in and out of a slot of the panel housing member to releasably engage the first rod to releasably couple the cargo panel to the lift gate and co-displacing with the lift gate as the lift gate rotates open or closed.

3. The system to detect and avoid spilled cargo of claim 1, wherein the cargo spill position defines a position of the storage item wherein the storage item may contact the lift gate or may be angled to tip toward the lift gate allowing the storage item to spill out of the cargo area when the lift gate is subsequently moved away from the closed and latched position.

4. The system to detect and avoid spilled cargo of claim 1, wherein the cargo spill position is defined as a visually detectable stripe which if visible to the vision system indicates the storage item is clear of the lift gate, and if partially or blocked from the vision system indicates presence of the storage item at the lift gate.

5. The system to detect and avoid spilled cargo of claim 1, further including a stop position of the lift gate defining an unlatched and not fully open position of the lift gate, wherein an opening operation of the lift gate is stopped at the stop position mitigating against spilling the storage item out of the automobile vehicle if the storage item is detected in the cargo spill position.

6. The system to detect and avoid spilled cargo of claim 1, wherein the vision system includes a camera providing a camera field-of-vision (FOV) within the cargo area, the camera FOV identifying multiple positions of the storage item from the cargo spill position.

7. A system to detect and avoid spilled cargo in an automobile vehicle, comprising:
an automobile vehicle rear cargo area including a floor to at least temporarily receive a storage item in the cargo area;
a lift gate moved between a closed and latched position and a fully open position inclusive to allow loading and removal of the storage item;
a vision system to identify the storage item when initially loaded in the cargo area and to identify if the storage item is initially positioned in a cargo spill position or subsequently moves to the cargo spill position, wherein the cargo spill position defines a position of the storage item wherein the storage item may contact the lift gate or may be angled to tip toward the lift gate allowing the storage item to spill out of the cargo area when the lift gate is subsequently moved away from the closed and latched position;
a cargo spill warning alerting an operator of the automobile vehicle when the vision system identifies the storage item is in the cargo spill position;
a cargo stop device releasably connected to the lift gate, wherein the cargo stop device defines a cargo panel deployed at the cargo spill position to mitigate against the storage item spilling in a rearward direction out of the cargo area, wherein the cargo panel is releasably engaged to a front facing surface of the lift gate using an operating system having multiple rods including at least a first rod and a second rod, and further including a first pin actuator positioned within a floor housing member and coupled to a floor structure of the floor, the first pin actuator rotating a first hook-shaped pin to releasably engage the first rod which retains the cargo panel, thereby allowing the cargo panel to be temporarily held by the first hook-shaped pin at the cargo spill position; and
an operating system to releasably store the cargo stop device when the storage item is not in the cargo spill position and to deploy the cargo stop device when the storage item is in the cargo spill position and further including a stop position of the lift gate defining an unlatched and not fully open position of the lift gate, wherein an opening operation of the lift gate is stopped at the stop position further mitigating against spilling the storage item out of the automobile vehicle when the storage item is detected in the cargo spill position.

8. The system to detect and avoid spilled cargo of claim 7, further including a second hook member rotatably connected to a structural member of the automobile vehicle and rotated by operation of the operating system, the second hook member in a second hook member first position is disengaged from the rod.

9. The system to detect and avoid spilled cargo of claim 8, wherein the first hook member when moved to a first hook member second position is released from the rod permitting the cargo stop device to move freely with respect to the lift gate.

10. The system to detect and avoid spilled cargo of claim 9, wherein when the first hook member is in the first hook member second position, the second hook member when moved to a second hook member second position releasably engages to the rod to releasably retain the cargo stop device to the structural member of the vehicle.

11. A method for detecting and avoiding spilled cargo in an automobile vehicle, comprising:
providing a lift gate at a cargo area of an automobile vehicle moved between a closed and latched position and a fully open position inclusive;
positioning a storage item in the cargo area;
positioning a cargo stop device at the lift gate with the cargo stop device initially releasably connected to the lift gate, wherein the cargo stop device defines a cargo panel deployed at a cargo spill position to mitigate against the storage item spilling in a rearward direction out of the cargo area, wherein the cargo panel is releasably engaged to a front facing surface of the lift gate using an operating system having multiple rods including at least a first rod and a second rod, and further including a first pin actuator positioned within a floor housing member and coupled to a floor structure of a vehicle floor, the first pin actuator rotating a first hook-shaped pin to releasably engage the first rod which retains the cargo panel, thereby allowing the cargo panel to be temporarily held by the first hook-shaped pin at the cargo spill position;

using a vision system to identify the storage item at an initial position when initially loaded in the cargo area and to detect if the storage item subsequently moves to second position defining the cargo spill position; and employing an operating system to release the cargo stop device from the lift gate and to deploy the cargo stop device to the cargo spill position when the storage item is detected in the cargo spill position to mitigate against release of the storage item as the lift gate moves toward the fully open position.

12. The method for detecting and avoiding spilled cargo of claim 11, further including:

calculating lines representing segments or portions of the cargo area including one or more lines representing the cargo spill position proximate to the lift gate, and lengths of the lines using a Hough transform equation;

determining if at initialization a line is detected at a y(:) position of a visually detectable cargo spill position;

identifying if a length of the visually detectable cargo spill position is less than a length actual of the line [is: length<length_actual]; and forwarding a cargo spill detected signal to the operation system if a response to the identifying step is YES to initiate release the cargo stop device.

13. The method for detecting and avoiding spilled cargo of claim 11, further including:

confirming receipt of a lift gate open request when the automobile vehicle is in a park gear;

detecting images of the storage item in the initial position and at the second position;

identifying Harris features of the storage item in the first position and the second position;

extracting neighborhood features of the storage item;

matching the neighborhood features to detect a feature point location shift in the images of the storage item in the initial position and at the second position;

determining if new feature points are detected in a cargo spill position Y-axis; and generating a cargo spill detected signal if a response to the determining step is YES to initiate release the cargo stop device.

* * * * *